United States Patent [19]

Saito et al.

[11] Patent Number: 5,246,985
[45] Date of Patent: Sep. 21, 1993

[54] RUBBER COMPOSITION AND TIRE THAT USES IT IN THE TREAD PORTION

[75] Inventors: Yuichi Saito; Shuichi Sakamoto; Naohiko Kikuchi; Takao Wada; Mamoru Uchida; Kiyoshige Muraoka, all of Hyogo, Japan

[73] Assignee: Sumitomo Rubber Industries, Ltd., Hyogo, Japan

[21] Appl. No.: 866,118

[22] Filed: Apr. 7, 1992

Related U.S. Application Data

[63] Continuation of Ser. No. 584,127, Sep. 18, 1990, abandoned, which is a continuation-in-part of Ser. No. 321,004, Mar. 9, 1989, abandoned.

[30] Foreign Application Priority Data

Mar. 10, 1988 [JP] Japan .................. 63-59017
Mar. 11, 1988 [JP] Japan .................. 63-58709
Sep. 13, 1988 [JP] Japan .................. 63-228952

[51] Int. Cl.⁵ .................. C08L 7/00; C08L 9/00; C08L 9/06
[52] U.S. Cl. .................. 524/13; 524/15; 524/16; 152/209 R
[58] Field of Search .................. 524/10, 11, 13, 15, 524/16

[56] References Cited

U.S. PATENT DOCUMENTS

| | | | |
|---|---|---|---|
| 2,670,777 | 3/1954 | Wallace | 152/209 |
| 2,739,135 | 3/1956 | Delang | 260/17.4 |
| 3,113,605 | 12/1963 | Fuetterer | 152/211 |
| 4,360,049 | 11/1982 | Imai | 152/209 R |
| 5,049,598 | 9/1991 | Saito et al. | 524/13 |

FOREIGN PATENT DOCUMENTS

563530 12/1932 Fed. Rep. of Germany .
933270 12/1947 France .
2395287 1/1979 France .

*Primary Examiner*—Carman J. Seccuro, Jr.
*Attorney, Agent, or Firm*—Birch, Stewart, Kolasch & Birch

[57] ABSTRACT

The rubber composition comprising a cellulosic material containing-processed powder product and rubber components and a studless tire having a tread portion that contains said rubber composition which is improved in the performance of travelling over snow and ice is disclosed.

2 Claims, 3 Drawing Sheets

RUBBER COMPOSITION AND TIRE THAT USES IT IN THE TREAD PORTION

This application is a continuation of application Ser. No. 07/584,127 filed on Sep. 18, 1990, now abandoned, which is a continuation-in-part of application Ser. No. 07/321,004 filed on Mar. 9, 1989, now abandoned.

FIELD OF THE INVENTION

The present invention relates to a rubber composition for use in tires and other articles. More particularly, the present invention relates to a rubber composition suitable for use in the treads of studless tires having sufficiently adequate performance for travel on snowy or icy roads.

BACKGROUND OF THE INVENTION

Tires for use in the winter season to travel over snowy and icy roads include studded tires, studless tire and tires fitted with steel tire chains. Studded tires have been required to provide good grip performance on frozen roads but because of the extensive wear they cause on pavement and on account of the resulting dust particles, regulations are being adopted to ban the use of studded tires.

More recently, studless tires have been developed in an effort to improve the low-temperature characteristics of tread rubber so that its grip performance will be comparable to that of studded tires. However, the performance of such studless tires on frozen roads is somewhat inferior to that of studded tires. A further problem with studless tires is that in order to provide improved low-temperature characteristics, softening agents such as ester-based plasticizers and naphthenic plasticizers have to be incorporated in large amounts, so that during extended use or storage, the plasticizers may be partly lost and deteriorated to cause an increased hardness in the tire tread; in other words, the performance of an aged studless tire on ice is inferior to that of a virgin tire. Because of these reasons, studless tires have not yet been fully commercialized.

SUMMARY OF THE INVENTION

An object, therefore, of the present invention is to provide a studless tire (e.g., a tire having a tread portion) that has improved grip performance on snowy or frozen roads and which can be used for an extended period of time without any deterioration in quality and without causing damage to roads.

Another object of the present invention is to provide a rubber composition suitable for use in the tread portion of such a studless tire, and other articles, for example a rubber tire chain.

These objects of the present invention can be attained by a rubber composition having a degree of acetone extraction of not more than 10% which comprises a cellulosic material containing-processed powder product having an average particle size of 20 to 600 μm and rubber components, wherein said rubber components comprise a diene-based rubber as a main ingredient with all or part of the remainder being a liquid diene-based rubber and wherein said cellulosic material containing-processed powder product is present in an amount of 3 to 25 parts by weight per 100 parts by weight of the rubber components, or a tire having a tread portion that is composed of a tire rubber composition having a degree of acetone extraction of not more than 10% which comprises a cellulosic material containing-processed powder product having an average particle size of 20 to 600 μm and rubber components, wherein said rubber components comprise a diene-based rubber as a main ingredient with all or part of the remainder being a liquid diene-based rubber and wherein said cellulosic material containing-processed powder product is contained in an amount of 3 to 25 parts by weight per 100 parts by weight of the rubber components.

BRIEF DESCRIPTION OF THE DRAWING

((a): Magnification (×15), (b): Magnification (×35))

((a): Magnification (×15), (b): Magnification (×35))

DETAILED DESCRIPTION OF THE INVENTION

The rubber components in the rubber composition of the present invention generally consist of a diene-based rubber such as natural rubber, polybutadiene, polyisoprene or a styrene-butadiene rubber, and preferably consist of 65 to 95 parts by weight and preferably 80 to 95 parts by weight, of one or some kinds of the above rubber, and 5 to 35 parts by weight and preferably 5 to 20 parts, by weight of a liquid diene-based polymer having a viscosity average molecular weight of 2,000 to 50,000 such as a liquid polyisoprene rubber or a liquid polybutadiene rubber, which may be used alone or in combination.

The present invention also provides a studless tire using in its tread portion a rubber composition that has a tan δ peak temperature of not more than −40° C. as measured with a viscoelastic spectrometer (manufactured by Iwamoto Seisakusho, K. K.).

The present invention further provides a studless tire using in its tread portion a rubber composition whose degree of acetone extraction is not more than 10%.

When the rubber composition of the present invention is used in the tread portion of a tire, especially a studless tire, and when the tire is rolling on a frozen road, the grip-on-ice of the tire is by no means reduced if it wears progressively because the cellulosic material containing-processed powder product falling off the surface of the tread will create voids, undulations and edges on said surface, which provide enhanced friction on the surface of ice. Particularly, when the cellulosic material containing-processed powder product is softer than the base rubber, the friction on the surface of ice is extremely enhanced to improve the grip-on-ice of the tire.

Figure 2A:
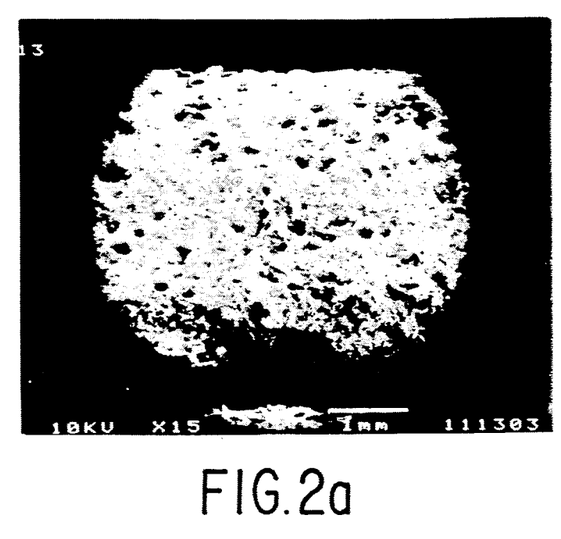
FIG. 2 is an electron microscope photograph showing voids, undulation and edges on a surface of tread rubber containing a cellulosic material containing-processed powder product according to the present invention, after travelling.
Figure 2B:
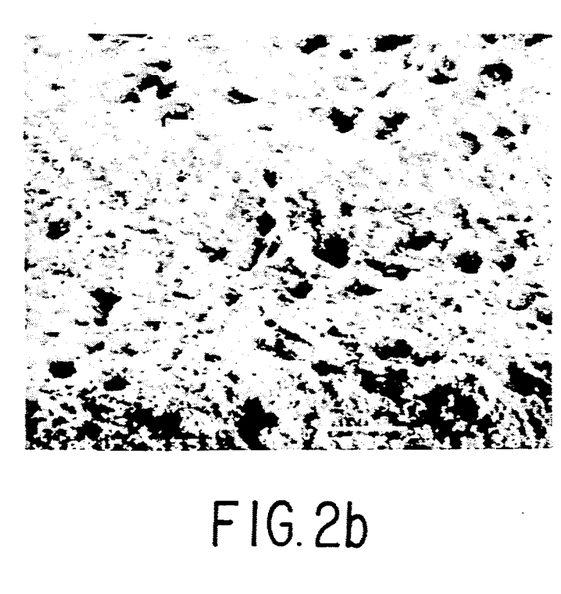
Figure 3A:
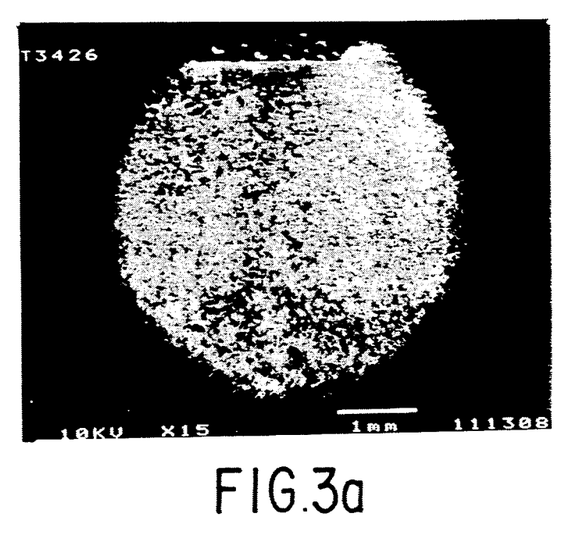
FIG. 3 is an electron microscope photograph showing a surface of conventional tread rubber containing no cellulosic material containing-processed powder product, after travelling.
Figure 3B:
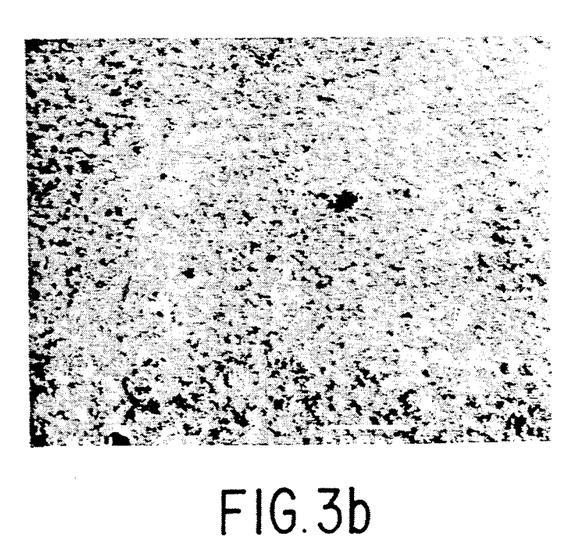

Further, as the surface of the cellulosic material containing-processed powder product is not smooth, when the cellulosic material containing-processed powder product falls off, the voids created have an irregular shape which is jagged as shown in FIG. 2. As a result, the grip-on-ice of the tire is improved.

It is proposed in JP-A-62-283001 and JP-A-63-89547 (That term "JP-A" as used herein means an "unexamined published Japanese patent application") that the voids are provided on the surface of the tread by previously adding a foam rubber to the tread. However, the voids obtained by the foam rubber have a circular shape or an elliptic shape. As a result, the grip-on-ice of the tire due to the voids having the circular or elliptic shape is inferior to that due to the voids having the irregular shape of the present invention. Further, when foam rubber is used to provide voids on the surface of the tire, usually all of the tread is made up of foam rubber. As a result, the rigidity of the tread deteriorates to give a bad influence to the driving stability. But when the voids, due to the present invention are present on only the surface of the tread, the above bad influence does not occur.

The processed powder product contains a cellulosic material, so it has a sufficiently good miscibility with rubber to be easily dispersed in the base rubber during mixing. In addition, this powder product binds loosely with rubber. Therefore, as the rolling tire wears progressively, this product readily falls off the surface of the tread but the tear strength of the tread will remain high and the undesired phenomena of cracking in the rubber at the bottom of the tread grooves will not occur. If materials of high hardness such as metals are incorporated in the base rubber, the tire will cause excessive wear in the surface of pavement or in the hardness of the rubber, and taken as a whole, would increase to impair adhesion to a frozen road (i.e., loss of grip on ice). These problems are entirely absent when using the cellulosic material containing-processed powder product of the present invention. Accordingly, considering these points, a cellulosic material has optimal hardness and is suitable for use in the rubber composition of the present invention.

The cellulosic material containing-processed powder product to be incorporated in the rubber composition of the present invention includes chaff (e.g., chaff of rice or wheat), cork chips, sawdust and other ground particles of plants. Chaff is particularly preferred for its optimal hardness. Chaff which is a naturally occurring product is a particulate material having asperities on its surface, so it has a sufficiently good compatibility with rubber to prevent reduction in its tear strength. Furthermore, chaff will not cause any deterioration in the ability of a tire to resist tread-groove cracking.

The cellulosic material containing-processed powder product for use in the present invention preferably has an average particle size of 20 to 600 μm, with the range of 100 to 200 μm being particularly preferred. If the average particle size of the powder product is less than 20 μm, the reinforcing effect of the powder product is insufficient to maintain the wear performance of the tread. If the average particle size of the powder product exceeds 600 μm, the surface of the tread of a rolling tire is easily damaged and the area of contact between rubber and the surface of ice will decrease to produce a tendency toward a reduced adhesion (lower grip on ice).

The cellulosic material containing-processed powder product is preferably incorporated in the rubber composition in an amount of 3 to 25 parts by weight per 100 parts by weight of base rubber, with the range of 5 to 15 parts by weight being particularly preferred. If the content of this powder product is less than 3 parts by weight per 100 parts by weight of base rubber, the effect (i.e., friction) due to voids on the surface of the tread will not be obtained. If the content of the powder product exceeds 25 parts by weight per 100 parts by weight of base rubber, the powder product itself will contact the surface of an ice road to decrease the area of contact between the base rubber and the surface of the road, producing a tendency toward a reduced adhesion. In addition, the wear resistance of the resulting rubber composition is likely to become low.

In a preferred embodiment of the present invention, the rubber composition of the present invention which is to be used as the base of the tread of a tire has a tan δ peak temperature of not more than −40° C. as measured with a viscoelastic spectrometer of Iwamoto Seisakusho, K. K. The modulus, in particular hardness, of a rubber composition having a tan δ peak temperature of more than −40° C. is largely dependent on temperature, and its hardness tends to increase in the low-temperature range of −40° to −10° C., causing reduction in its grip on ice.

One of the problems with studless tires contemplated by the present invention is that their performance on ice will deteriorate during extended use and this problem is particularly pronounced when a plasticizer is incorporated in a large amount in a tread rubber composition. With a rubber composition having 20% or more acetone extraction, the tread rubber becomes very hard as a result of use for only 2 or 3 years and a 10-15 point increase in hardness occurs as compared to a virgin tire. In accordance with the present invention, it is particularly preferable to use a rubber composition having not more than 10% acetone extraction and this is effective in preventing deterioration in performance on ice even after extended use.

The following examples are provided for the purpose of further illustrating the present invention but are in no way to be taken as limiting.

EXAMPLE I

Four tire samples (I-1 to I-4) were prepared in accordance with the present invention by incorporating chaff in tread rubber compositions. The rubber compositions contained chaff having average particle sizes of 20 to 600 μm ("Sumiselco", the trade name, manufactured by Sumikin Bussan Kabushiki Kaisha) and a liquid polybutadiene.

Five comparative tire samples (I-1 to I-5) were also prepared using tread rubber compositions incorporating no chaff.

The specific ingredients of the tread rubber compositions employed in the respective samples are shown in Table 1. The addition of an ester-based plasticizer in all samples except comparative sample I-5 was so adjusted that the degree of acetone extraction in rubber is from 7 to 8%.

TABLE 1

|  | Comparative sample | | | | | Sample | | | |
|---|---|---|---|---|---|---|---|---|---|
|  | I-1 | I-2 | I-3 | I-4 | I-5 | I-1 | I-2 | I-3 | I-4 |
| Natural rubber | 70 | 58 | 46 | 34 | 60 | 46 | 46 | 46 | 46 |
| BR | 30 | 30 | 30 | 30 | 40 | 30 | 30 | 30 | 30 |

TABLE 1-continued

| | Comparative sample | | | | | Sample | | | |
|---|---|---|---|---|---|---|---|---|---|
| | I-1 | I-2 | I-3 | I-4 | I-5 | I-1 | I-2 | I-3 | I-4 |
| Liquid BR (Trade name "LBR130") | — | 12 | 24 | 36 | — | 24 | 24 | 24 | 24 |
| ISAF carbon | 56 | 56 | 56 | 56 | 65 | 56 | 56 | 56 | 56 |
| Sumiselco | — | — | — | — | — | 5 | 10 | 15 | 20 |
| Dioctyl sebacate | 7 | 7 | 7 | 7 | 36 | 7 | 7 | 7 | 7 |
| Wax | 2 | 2 | 2 | 2 | 2 | 2 | 2 | 2 | 2 |
| Antioxidant 13 | 1.5 | 1.5 | 1.5 | 1.5 | 1.5 | 1.5 | 1.5 | 1.5 | 1.5 |
| Stearic acid | 2 | 2 | 2 | 2 | 2 | 2 | 2 | 2 | 2 |
| Zinc oxide | 5 | 5 | 5 | 5 | 5 | 5 | 5 | 5 | 5 |
| Sulfur | 1.5 | 1.5 | 1.5 | 1.5 | 1.5 | 1.5 | 1.5 | 1.5 | 1.5 |
| Cure accelerator CZ | 1 | 1 | 1 | 1 | 1 | 1 | 1 | 1 | 1 |
| Acetone extraction (%) | 7.6 | 7.9 | 8.3 | 8.3 | 22 | 8.2 | 8.3 | 8.4 | 8.3 |
| Hardness R.T. | 64 | 60 | 55 | 51 | 56 | 53 | 54 | 56 | 59 |
| −10° C. | 69 | 65 | 61 | 57 | 62 | 58 | 59 | 62 | 64 |
| −30° C. | 76 | 72 | 69 | 66 | 69 | 64 | 64 | 67 | 69 |
| Coefficient of friction on ice | | | | | | | | | |
| 0-5 km/hr | — | — | 103 | — | 100 | 127 | 124 | 113 | 105 |
| 0-10 km/h | — | — | 102 | — | 100 | 129 | 123 | 111 | 107 |
| Increase in hardness due to thermal aging | 7 | 6 | 7 | 7 | 14 | 6 | 5 | 5 | 5 |
| Tear strength (kg/cm) | 63.7 | 54.3 | 47.6 | 39.4 | 43.7 | 45.9 | 44.0 | 43.2 | 41.3 |
| Pico wear index | 143 | 132 | 125 | 97 | 100 | 109 | 108 | 102 | 97 |
| Stopping index with actual vehicle on ice | — | — | 108 | — | 100 | 119 | 115 | 112 | 102 |

The hardness, coefficient of friction on ice, increased hardness due to thermal aging, tear strength and pico wear index data for the samples are shown in Table 1.

The data of "coefficient of friction on ice" in Table 1 was obtained by the following test.

Site: Outdoor track with a frozen road in Hokkaido.
Temperature of ice surface: −3° to −2° C.
Method: Using a dynamic friction tester (manufactured by Sancor Co.), the coefficient of friction between the road surface and the tire under test was measured with brake applied at an initial stopping speed of 40 km/h. The results are indicated in terms of an index with the value for comparative sample I-5 being taken as 100.

Test on actual vehicle: Steel radial tires (165 SR 13) were prepared and the coefficient of friction between these tires and the road surface was calculated on the basis of the stopping distance measured by applying brake at an initial stopping speed of 30 mk/h with the tires locked. Two kinds of the coefficient were calculated. One was the coefficient from 5 km/h to 0 km/h and the other was from 10 km/h to 0 km/h. The results are indicated in terms of an index with the value for comparative sample I-5 being taken as 100.

The data of "increased hardness due to thermal aging" in Table 1 was obtained by measuring the hardness of a sample after it was left in an over (100° C.) for 10 days. The hardness measurement was conducted with reference made to the hardness and aging tests described in JIS K6301. Tear strength measurements were conducted in compliance with the tear test described in JIS K6301. Pico wear index measurements were conducted in compliance with ASTM D2228.

Comparative sample I-5 was a studless tire made of a conventional tread rubber composition. Comparative sample I-1 was harder than comparative sample I-5. Comparative samples I-2 and I-3 were adjusted to have hardness and low-temperature characteristics comparable to those of comparative sample I-5 through addition of liquid polybutadiene.

Samples I-1 to I-4 were made of the same rubber composition as that of comparative sample I-3 except that they contained chaff in amounts of 5 to 30 parts by weight. Samples I-1 and I-2 containing 5 to 10 parts by weight of chaff were less hard and had better values of friction coefficient on ice as compared to comparative sample I-3. Samples I-3 and I-4 containing more chaff than samples I-1 and I-2 were harder than comparative sample I-3 but their coefficients of friction on ice were improved probably because of the spike effect of chaff that scratched the surface of ice. As for the increase in hardness due to thermal aging, comparative sample I-5 having 22% acetone extraction showed an increase of 14 points, whereas samples I-1 to I-4 having not more than 10% acetone extraction showed increases of only 5 to 7 points.

EXAMPLE II

In order to demonstrate the effectiveness of incorporating a liquid diene-based polymer as an additional rubber component, the following test was conducted.

Figure 1:
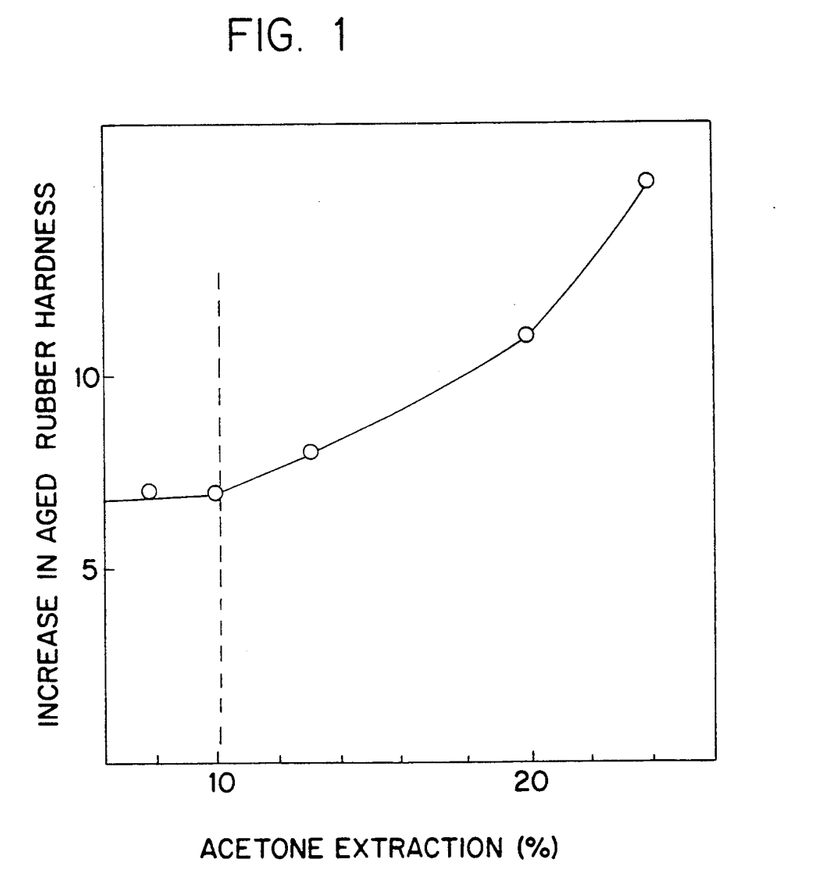
FIG. 1 is a graph showing the relationship between the degree of acetone extraction and the increase in the hardness of an aged tire.

Samples of tread rubber composition containing various amounts of a plasticizer were left at 100° C. for 10 days and the increase in the hardness of each of the aged samples was measured. As is apparent from the results of FIG. 1, an extreme increase in hardness occurred when the degree of acetone extraction was 10% or more.

These test results show that it is preferred to ensure that the oil content in the tread rubber composition for use in a studless tire is held at not more than 10% in terms of acetone extraction. By so doing, the tire is provided with an enhanced resistance to deterioration in performance on ice due to extended use.

The practical implications of reducing the degree of acetone extraction to 10% and below are as follows: by incorporating a low-molecular weight polymer that is not be extracted with acetone, the time-dependent change in rubber quality due to aging can be prevented and at the same time, a softening effect comparable to those of ester-based plasticizers and naphthenic plasticizers can be realized.

The "low-molecular weight polymer" as described above is a diene-based polymer; preferably, a liquid isoprene or polybutadiene rubber which have good low-temperature characteristics are incorporated since they ensure an improvement in the low-temperature characteristics comparable to that attained by ester-based plasticizers.

The viscosity average molecular weight of the low-molecular weight polymer is preferably within the range of 2,000 to 50,000. If the viscosity average molecular weight is less than 2,000, the polymer is easily extracted with acetone; if the viscosity average molecular weight is more than 50,000, the intended softening effect is not attained.

The above-mentioned liquid diene-based polymers are preferably incorporated in amounts of 5 to 35 parts by weight. If their content is less than 5 parts by weight, the intended softening effect is not attained; if their content exceeds 35 parts by weight, the tear strength of rubber is reduced, resulting in a decrease in its resistance to wear due to tire rolling on pavement.

In order to prove the effectiveness of incorporating liquid diene-based polymers, comparative samples II-1 to II-7 were prepared; comparative sample II-1 contained an ester-based plasticizer in place of liquid diene-based polymers; comparative sample II-2 contained neither an ester-based plasticizer nor a liquid diene-based polymer; comparative samples II-3 to II-7 contained liquid diene-based polymers. Additional samples II-1 to II-5 which were within the scope of the present invention were prepared in order to show the effectiveness of using liquid diene-based polymers in combination with chaff (Sumiselco). The specific ingredients of the tread rubber compositions employed in the respective samples and the results of evaluations conducted on these samples are collectively shown in Tables 2-1 and 2-2.

TABLE 2-2

| | Sample | | | | |
|---|---|---|---|---|---|
| | II-1 | II-2 | II-3 | II-4 | II-5 |
| Natural rubber | 60 | 60 | 60 | 60 | 60 |
| Polybutadiene | 40 | 40 | 40 | 40 | 40 |
| ISAF carbon | 65 | 65 | 65 | 65 | 65 |
| Oil in polymer | 21 | 21 | 21 | 21 | 21 |
| Sumiselco | 10 | 10 | 10 | 10 | 10 |
| Dioctyl sebacate | — | — | — | — | — |
| Liquid IR (1) (Trade name "LIR50") | 14 | — | — | — | — |
| Liquid IR (2) (Trade name "LIR30") | — | 14 | — | — | — |
| Liquid IR (3) (Trade name "LIR290) | — | — | 14 | — | — |
| Liquid BR (1) (Trade name "LBR160") | — | — | — | 14 | — |
| Liquid BR (2) (Trade name "LBR130") | — | — | — | — | 14 |
| Wax | 2 | 2 | 2 | 2 | 2 |
| Antioxidant 13 | 1.5 | 1.5 | 1.5 | 1.5 | 1.5 |
| Stearic acid | 2 | 2 | 2 | 2 | 2 |
| Zinc oxide | 5 | 5 | 5 | 5 | 5 |
| Sulfur | 1.5 | 1.5 | 1.5 | 1.5 | 1.5 |
| Cure accelerator CZ | 1 | 1 | 1 | 1 | 1 |
| Acetone extraction (%) | 13.8 | 14.5 | 14.5 | 14.2 | 16.0 |
| Hardness R.T. | 58 | 58 | 59 | 57 | 55 |
| −10°C. | 61 | 61 | 64 | 62 | 59 |
| −30°C. | 68 | 67 | 72 | 68 | 65 |
| Tear strength (kg/cm) | 61.5 | 60.1 | 55.7 | 58.5 | 58.0 |
| Pico wear index | 104 | 99 | 102 | 101 | 93 |
| Coefficient of friction on ice | 116 | 117 | 113 | 116 | 120 |

As is clearly seen from Table 2-1, with respect to the hardness, comparative samples II-3 to II-7 were not

TABLE 2-1

| | Comparative sample | | | | | | |
|---|---|---|---|---|---|---|---|
| | II-1 | II-2 | II-3 | II-4 | II-5 | II-6 | II-7 |
| Natural rubber | 60 | 60 | 60 | 60 | 60 | 60 | 60 |
| Polybutadiene | 40 | 40 | 40 | 40 | 40 | 40 | 40 |
| ISAF carbon | 65 | 65 | 65 | 65 | 65 | 65 | 65 |
| Oil in polymer | 21 | 21 | 21 | 21 | 21 | 21 | 21 |
| Dioctyl sebacate | 14 | — | — | — | — | — | — |
| Liquid IR (1) (Trade name "LIR50") | — | — | 14 | — | — | — | — |
| Liquid IR (2) (Trade name "LIR30") | — | — | — | 14 | — | — | — |
| Liquid IR (3) (Trade name "LIR290") | — | — | — | — | 14 | — | — |
| Liquid BR (1) (Trade name "LBR160") | — | — | — | — | — | 14 | — |
| Liquid BR (2) (Trade name "LBR130") | — | — | — | — | — | — | 14 |
| Wax | 2 | 2 | 2 | 2 | 2 | 2 | 2 |
| Antioxidant 13 | 1.5 | 1.5 | 1.5 | 1.5 | 1.5 | 1.5 | 1.5 |
| Stearic acid | 2 | 2 | 2 | 2 | 2 | 2 | 2 |
| Zinc oxide | 5 | 5 | 5 | 5 | 5 | 5 | 5 |
| Sulfur | 1.5 | 1.5 | 1.5 | 1.5 | 1.5 | 1.5 | 1.5 |
| Cure accelerator CZ | 1 | 1 | 1 | 1 | 1 | 1 | 1 |
| Viscosity average molecular weight of liquid IR or BR | — | — | 47000 | 29000 | 25000 | 30000 | 3000 |
| Acetone extraction (%) | 21.2 | 15.8 | 14.4 | 14.8 | 14.7 | 14.7 | 16.4 |
| Hardness R.T. | 54 | 62 | 57 | 56 | 58 | 56 | 53 |
| −10° C. | 58 | 66 | 60 | 60 | 64 | 61 | 58 |
| −30° C. | 65 | 74 | 68 | 67 | 72 | 68 | 64 |
| Tear strength (kg/cm) | 43.7 | 36.4 | 61.2 | 59.0 | 56.0 | 57.0 | 54.5 |
| Pico wear index | 100 | 133 | 125 | 113 | 120 | 121 | 110 |
| Coefficient of friction on ice | 100 | 90 | 96 | 95 | 88 | 92 | 102 | superior to comparative sample II-1 but the hardness values of comparative samples II-3 to II-7 were lower than that of comparative sample II-2. The liquid diene-based polymers in these comparative samples were not extracted with acetone.

Comparative samples II-3 to II-7 were also improved with respect to tear strength and pico wear index as compared to comparative sample II-1 incorporating an ester-based plasticizer. Comparative sample II-7 was also equal to comparative sample II-1 with respect to the hardness; the degree of acetone extraction in comparative sample II-7 was somewhat higher than that in comparative sample II-2 and is not considered to decrease during tire rolling or storage in a warehouse.

However, the addition of liquid diene-based polymers alone is insufficient to achieve an improvement in the coefficient of friction on ice to the extent contemplated by the present invention; this is why additional samples II-1 to II-5 were prepared using chaff (Sumiselco) in combination with the liquid diene-based polymers used in comparative samples II-3 to II-7; all of these samples prepared in accordance with the present invention were comparable to or better than comparative sample II-1 with respect to pico wear index and, at the same time, they attained a marked improvement in the coefficient of friction on ice.

EXAMPLE III

Four tire samples (165 SR 13) having their treads prepared from rubber compositions incorporating chaff were prepared using the recipes shown in Table 3. An additional sample was prepared as a comparison using the conventional ingredients shown in Table 3. These samples were subjected to various tests and the results are shown in Table 3. The chaff used was Sumiselco of Sumitomo Bussan Kabushiki Kaisha having particle sizes ranging from 100 to 300 μm.

The data of "coefficient of friction on ice" in Table 3 was obtained by the following test.
Site: Outdoor track with a frozen road in Hokkaido.
Temperature of ice surface: −3° to −2° C.
Method: Using a dynamic friction tester (manufactured by Sancor Co.), the coefficient of friction between the road surface and the tire under test was measured with brake applied at an initial stopping speed of 40 km/h. The results are indicated in terms of an index with the value for comparative sample III-1 being taken as 100.

The data of "tire test on ice" in Table 3 was obtained by the following test.
Site Outdoor track with a frozen road in Hokkaido.
Temperature of ice surface: −3° to −2° C.
Test vehicle: Japanese passenger car (FF 1500 cc).
Rim: 5J×13.
Internal pressure: 1.9 kg/cm².
Method: Friction coefficients were calculated on the basis of the stopping distance measured by applying brake at an initial stopping speed of 30 km/h with the tires locked. The results are indicated in terms of an index with the value for comparative sample III-1 being taken as 100.

TABLE 3

|  | Sample | | | | Comparative sample |
|---|---|---|---|---|---|
|  | III-1 | III-2 | III-3 | III-4 | III-1 |
| Natural rubber | 60 | 60 | 60 | 60 | 60 |
| Polybutadiene | 40 | 40 | 40 | 40 | 40 |
| ISAF carbon | 65 | 65 | 65 | 65 | 65 |
| Oil in polymer | 36 | 36 | 36 | 36 | 36 |
| Wax | 2 | 2 | 2 | 2 | 2 |
| Antioxidant 13 | 1.5 | 1.5 | 1.5 | 1.5 | 1.5 |
| Stearic acid | 2 | 2 | 2 | 2 | 2 |
| Zinc oxide | 3 | 3 | 3 | 3 | 3 |
| Sumiselco | 6 | 12 | 24 | 36 | — |
| Sulfur | 1.5 | 1.5 | 1.5 | 1.5 | 1.5 |
| Cure accelerator CZ | 1 | 1 | 1 | 1 | 1 |
| (Cured test piece) | | | | | |
| Hardness R.T. | 54 | 53 | 55 | 65 | 56 |
| 0° C. | 64 | 63 | 65 | 75 | 65 |
| Tear strength (kg/cm) | 32.9 | 33.8 | 29.1 | 28.9 | 30.0 |
| Stress at 100% elongation | 14 | 14 | 16 | 23 | 18 |
| Tensile strength | 126 | 130 | 121 | 110 | 125 |
| Elongation at break (%) | 471 | 483 | 415 | 334 | 450 |
| Coefficient of friction on ice | 118 | 120 | 58 | 27 | 100 |
| (Tire test on ice) | | | | | |
| Coefficient of friction on ice | 109 | 112 | 105 | 101 | 100 |
| Maximum traction (μ) | 120 | 122 | 106 | 101 | 100 |
| Average traction (μ) | 123 | 131 | 107 | 101 | 100 |

EXAMPLE IV

Five tire samples (165 SR 13) having their treads prepared from rubber compositions incorporating various cellulosic material containing-processed powder products in accordance with the present invention were prepared using the ingredients shown in Table 4. An additional sample was prepared as a comparison using the conventional ingredients shown in Table 4. These samples were subjected to various tests and the results are shown in Table 4.

The data of "friction coefficient on ice for cured test piece" in Table 4 was obtained by the following test.
Site: Outdoor track with a frozen road in Hokkaido.
Temperature of ice surface: −3° to −2° C.
Method: Using a dynamic friction tester (manufactured by Sancor Co.), the coefficient of friction between the road surface and the test tire was measured with brake applied at an initial stopping speed of 40 km/h. The results are shown in terms of an index with the value for comparative sample IV-1 being taken as 100.

The data of "tire test on ice" in Table 4 was obtained by the following test.
Site: Outdoor track with a frozen road in Hokkaido.
Temperature of ice surface: −3° to −2° C.
Test vehicle: Japanese passenger car (FF 1500 cc).
Rim: 5J×13.
Internal pressure: 1.9 kg/cm².
Method: Friction coefficients were calculated on the basis of the stopping distance measured by applying brake at an initial stopping speed of 30 km/h with the tires locked. The results are shown in terms of an index with the value for comparative sample IV-1 being taken as 100.

TABLE 4

| | Sample | | | | | Comparative sample |
|---|---|---|---|---|---|---|
| | IV-1 | IV-2 | IV-3 | IV-4 | IV-5 | IV-1 |
| Natural rubber | 60 | 60 | 60 | 60 | 60 | 60 |
| Polybutadiene | 40 | 40 | 40 | 40 | 40 | 40 |
| ISAF carbon | 65 | 65 | 65 | 65 | 65 | 65 |
| Oil in polymer | 36 | 36 | 36 | 36 | 36 | 36 |
| Wax | 2 | 2 | 2 | 2 | 2 | 2 |
| Antioxidant 13 | 1.5 | 1.5 | 1.5 | 1.5 | 1.5 | 1.5 |
| Stearic acid | 2 | 2 | 2 | 2 | 2 | 2 |
| Zinc oxide | 3 | 3 | 3 | 3 | 3 | 3 |
| Chaff (rice) (av. particle size, ca. 500 μm) | 15 | — | — | — | — | — |
| Chaff (wheat) (av. particle size, ca. 200 μm) | — | 15 | — | — | — | — |
| Cork chips (av. particle size, ca. 500 μm) | — | — | 15 | — | — | — |
| Particle board chips (av. particle size 80 μm) | — | — | — | 15 | — | — |
| Sawdust (av. particle size, ca. 500 μm) | — | — | — | — | 15 | — |
| Sulfur | 1.5 | 1.5 | 1.5 | 1.5 | 1.5 | 1.5 |
| Cure accelerator CZ | 1 | 1 | 1 | 1 | 1 | 1 |
| Friction coefficient on ice for cured test piece | 131 | 125 | 115 | 110 | 111 | 100 |
| Stopping distance index in tire test on ice | 115 | 109 | 107 | 106 | 106 | 100 |
| Maximum traction ($\mu$) | 125 | 120 | 109 | 108 | 108 | 100 |
| Average traction ($\mu$) | 123 | 120 | 108 | 108 | 107 | 100 |

EXAMPLE V

Seven steel radial tire samples were prepared using tread tire rubber compositions containing four grades of Sumiselco. The ingredients of the individual rubber compositions are shown in Table 5, and the four grades of Sumiselco had the following average particle sizes: (1) 100-120 μm; (2) 40-60 μm; (3) 200-250 μm; and (4) 400-600 μm. These samples were subjected to various tests by methods which were essentially the same as those employed in Example III. The test results are shown in Table 5.

The data of "wear resistance of tire" in table 5 was obtained by conducting a test under the following conditions:

Test vehicle: Japanese car (FF 1500 cc).
Tire size: 165 SR 13.
Rim: 5J×13.
Internal pressure: 1.9 kg/cm$^2$.
Distance covered: 10$^4$ km (5×10$^3$ km on a freeway and 5×10$^3$ km on a highway).

The method of testing the tire performance on ice was the same as described in Example IV.

TABLE 5

| | Sample | | | | | | | Comparative sample |
|---|---|---|---|---|---|---|---|---|
| | V-1 | V-2 | V-3 | V-4 | V-5 | V-6 | V-7 | V-1 |
| Natural rubber | 60 | 60 | 60 | 60 | 60 | 60 | 60 | 60 |
| Polybutadiene | 40 | 40 | 40 | 40 | 40 | 40 | 40 | 40 |
| ISAF carbon | 65 | 65 | 65 | 65 | 65 | 65 | 65 | 65 |
| Oil in polymer | 36 | 36 | 36 | 36 | 36 | 36 | 36 | 36 |
| Wax | 2 | 2 | 2 | 2 | 2 | 2 | 2 | 2 |
| Antioxidant 13 | 1.5 | 1.5 | 1.5 | 1.5 | 1.5 | 1.5 | 1.5 | 1.5 |
| Stearic acid | 2 | 2 | 2 | 2 | 2 | 2 | 2 | 2 |
| Zinc oxide | 3 | 3 | 3 | 3 | 3 | 3 | 3 | 3 |
| Sumiselco* | | | | | | | | |
| (1) | 6 | 12 | 24 | 36 | — | — | — | — |
| (2) | — | — | — | — | 12 | — | — | — |
| (3) | — | — | — | — | — | 12 | — | — |
| (4) | — | — | — | — | — | — | 12 | — |
| Sulfur | 1.5 | 1.5 | 1.5 | 1.5 | 1.5 | 1.5 | 1.5 | 1.5 |
| Cure accelerator CZ | 1.0 | 1.0 | 1.0 | 1.0 | 1.0 | 1.0 | 1.0 | 1.0 |
| (Cured test piece) | | | | | | | | |
| Hardness R.T. | 54 | 54 | 56 | 64 | 54 | 55 | 57 | 56 |
| Index of friction coefficient on ice | 118 | 129 | 61 | 52 | 109 | 110 | 82 | 100 |
| (Tire test on ice) | | | | | | | | |
| Stopping distance index (30 km/h) | 109 | 117 | 113 | 103 | 102 | 104 | 102 | 100 |

TABLE 5-continued

| | Sample | | | | | | | Comparative sample |
|---|---|---|---|---|---|---|---|---|
| | V-1 | V-2 | V-3 | V-4 | V-5 | V-6 | V-7 | V-1 |
| Wear resistance index | 97 | 95 | 86 | 78 | 81 | 91 | 92 | 100 |

*Sumiselco's average particle size:
(1) 100–120 μm
(2) 40–60 μm
(3) 200–250 μm
(4) 400–600 μm As is apparent from the results described in Examples I–V, the tire rubber composition of the present invention which comprises a cellulosic material containing-processed powder product and rubber components has the advantage that when used in a treaded tire such as a studless tire, it exhibits improved grip on a frozen road surface by the enhanced friction between the processed powder product and the frozen raod. The use of a cellulosic material containing-processed powder product such as chaff offers the added advantage that the road surface is not damaged as compared with the case of using a very hard material such as a metal.

When the rubber components comprises 65 to 95 parts by weight of a diene-based rubber such as natural rubber, polybutadiene, polyisoprene or a styrene-butadiene copolymer, and 5 to 35 parts by weight of a liquid diene-based polymer having a viscosity average molecular weight of 2,000 to 50,000, an amount of the acetone extraction in the rubber composition can be reduced to 10% or less, and this contributes to a further improvement in the durability as evidenced by high resistance to deterioration in quality during prolonged use.

While the invention has been described in detail and with reference to specific embodiments thereof, it will be apparent to one skilled in the art that various changes and modifications can be made therein without departing from the spirit and scope thereof.

What is claimed is:

1. A rubber composition having a degree of acetone extraction of not more than 10% which comprises a cellulosic material powder product having an average particle size of 20 to 600 μm, said powder product being at least one material selected from the group consisting of chaff of rice or wheat, cork chips, and sawdust, and base rubber components, wherein said base rubber components comprises from 65 to 95 parts by weight of a solid diene-based rubber as a main ingredient, said diene-based rubber being selected from the group consisting of natural rubber, polybutadiene, polyisoprene, styrene-butadiene rubber and mixtures thereof, and 5 to 35 parts by weight of a liquid diene-based rubber selected from the group consisting of liquid polyisoprene rubber, liquid polybutadiene rubber and mixtures thereof, and wherein said cellulosic material powder product is softer than the base rubber is present in an amount of 3 to 25 parts by weight per 100 parts by weight of the base rubber components.

2. A tire having a tread portion that is composed of a tire rubber composition having a degree of acetone extraction of not more than 10% which comprises a cellulosic material powder product having an average particle size of 20 to 600 μm, said powder product being at least one material selected from the group consisting of chaff of rice or wheat, cork chips, and sawdust, and base rubber components, wherein said base rubber components comprise from 65 to 95 parts by weight of a solid diene-based rubber as a main ingredient, said diene-based rubber being selected from the group consisting of natural rubber, polybutadiene, polyisoprene, styrene-butadiene rubber and mixtures thereof, and 5 to 35 parts by weight of a liquid diene-based rubber selected from the group consisting of liquid polyisoprene rubber, liquid polybutadiene rubber and mixtures thereof, and wherein said cellulosic material powder product is softer than the base rubber is present in an amount of 3 to 25 parts by weight per 100 parts by weight of the base rubber components.

* * * * *